Figure 1:
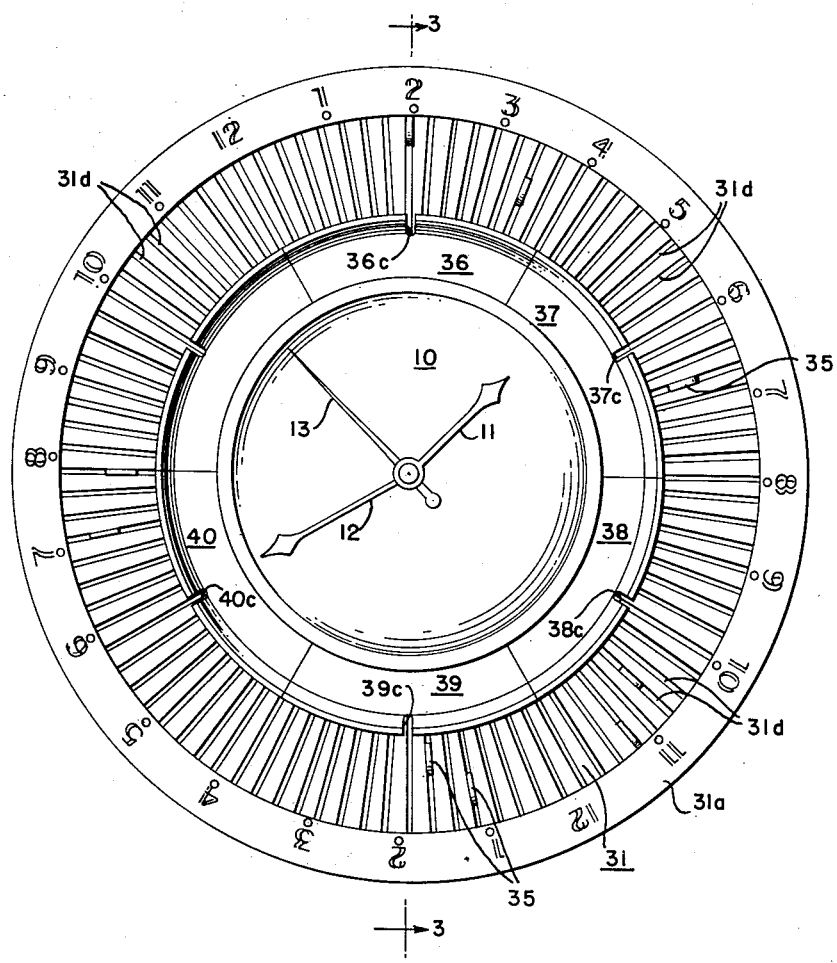

Sept. 23, 1952        H. F. ELLIOTT        2,611,430

PROGRAM-SCHEDULING APPARATUS

Filed Jan. 3, 1951        7 Sheets-Sheet 1

*INVENTOR.*
HAROLD F. ELLIOTT

BY Laurence B. Dodds

ATTORNEY

Sept. 23, 1952          H. F. ELLIOTT          2,611,430

PROGRAM-SCHEDULING APPARATUS

Filed Jan. 3, 1951          7 Sheets-Sheet 2

*INVENTOR.*
HAROLD F. ELLIOTT
BY Laurence B. Dodds
ATTORNEY

Sept. 23, 1952     H. F. ELLIOTT     2,611,430
PROGRAM-SCHEDULING APPARATUS

Filed Jan. 3, 1951     7 Sheets-Sheet 3

INVENTOR.
HAROLD F. ELLIOTT
BY
ATTORNEY

Sept. 23, 1952  H. F. ELLIOTT  2,611,430
PROGRAM-SCHEDULING APPARATUS
Filed Jan. 3, 1951  7 Sheets-Sheet 4

*INVENTOR.*
HAROLD F. ELLIOTT
BY Laurence B. Dodds
ATTORNEY

*INVENTOR.*
HAROLD F. ELLIOTT
BY Laurence B. Dodds
ATTORNEY

Patented Sept. 23, 1952

2,611,430

UNITED STATES PATENT OFFICE 2,611,430

PROGRAM-SCHEDULING APPARATUS

Harold F. Elliott, Oakland, Calif.

Application January 3, 1951, Serial No. 204,255

7 Claims. (Cl. 161—1)

This invention relates to program-scheduling apparatus and, while it is of general application, it is particularly suitable for embodiment in apparatus for determining the tuning of a radio-broadcast receiver at 15-minute intervals over a 24-hour period.

In applicant's prior Patent 2,410,724, granted November 5, 1946, for "Program-Scheduling Apparatus," there is described and claimed such an apparatus of simplified and economical construction, involving a minimum number of elements which must be positioned to set up a program of a given number of functions, for example, tuning to a number of radio broadcast stations, over a given time interval and one which can be readily adjusted by an unskilled user from the front face of the apparatus. In brief, the program-scheduling apparatus of Patent 2,410,724 for setting up a predetermined schedule of a plurality of functions within a given time period comprises a group of settable members, means for movably supporting such members, and a group of member-setting devices. One of such groups corresponds in number to the number of time intervals in the total time period and the other group corresponds in number to the number of functions being controlled. The apparatus also includes means for supporting the member-setting devices for movement to set a member in registry therewith, the two supporting means being relatively movable to bring each device into registry with any of such members to set the same. Each of the member-setting devices has a different characteristic movement for moving a registering member a different amount and the apparatus further includes means responsive to the positions of said members for determining the desired function-time intervals.

The program-scheduling apparatus of applicant's prior patent includes a main distributor mounted on the 24-hour shaft of the timer for routing of the control action. The scheduling of each desired function is accomplished by completing a control action, for example, by completing a circuit to tune to a desired radio station, for several minutes, the commutator directing the control current to a selected one of a plurality of broadcast station tuners through relays, motor-operated servo mechanisms, or the like. The apparatus includes a mechanism for setting up a series of cams or actuating members for the multiple-function distributor, the control apparatus and distributor being relatively movable by a timing mechanism having a 24-hour cycle. Precision timing is secured by an auxiliary contact device which is operated for a short interval of the order of five to ten seconds, sufficient to complete the tuning of a radio receiver, the auxiliary contact device being actuated by an hour or quarter-hour shaft for determining the exact commencement and completion of each function-time interval.

In all of such prior art program-scheduling apparatus, the relative motion between the distributing or commutating mechanism and the apparatus for scheduling the program is continuous, which is quite satisfactory for many applications. Because of the economical limitation on the power of the timing motors used in such apparatus, all of the distributing and routing devices are necessarily of the low-power type, auxiliary relays or servo mechanisms being utilized in case any of the control functions involved include circuits requiring any considerable amount of power which, in turn, require substantial switch contact pressures, as in many industrial control systems.

The present invention is directed to an improvement on the program-scheduling apparatus of applicant's prior Patent 2,410,724 in which the routing distributor and the precision timing mechanism are combined in a single multiple-contact switching mechanism. The present invention is also based upon a device for importing an intermittent snap-action relative movement between the routing distributor and the switching mechanism, thereby permitting the storage of energy between successive operations. Such an apparatus can be driven by a micro-power timer motor and yet be capable of operating directly control devices or switching circuits handling substantial amounts of power and involving substantial switch contact pressures.

It is an object of the present invention, therefore, to provide a new and improved program-scheduling apparatus of the general type described in applicant's prior Patent 2,410,724 of extremely simple and economical construction.

It is another object of the invention to provide a new and improved program-scheduling apparatus of the type described, in which the function-time scheduling distributor or commutator and the precision timing apparatus are combined in a single mechanical assembly.

It is another object of the invention to provide a new and improved program-scheduling apparatus of the type described, in which the relative movement between the function-time scheduling distributor or commutator and the program-setting apparatus is intermittent rather than continuous.

It is a further object of the invention to provide a new and improved program-scheduling apparatus of the type described, in which function control devices or circuits of substantial power rating may be operated directly by the scheduling apparatus and without the aid of relays or servo mechanisms, even though the apparatus is driven by a micro-power motor.

In accordance with the invention, there is provided in a program apparatus for setting up a predetermined series of operations within a given time interval and including a continuously driven timing element, an operating member and a supporting member carrying a plurality of elements settable in correspondence with desired time intervals, such members being relatively movable to register said settable elements with said operating member, a precision driving mechanism for one of such members comprising a driven member unitary with said one such members and including a series of stops related in number to the number of desired time intervals within said given time interval. The driving mechanism also includes an energy-storage lost-motion driving connection between the timing element and the driven member, latching means disposed to engage the stops in sequence to restrain the driven member, and an auxiliary precision timing member adapted to be driven by the timing element with a higher speed ratio than the driven member for periodically releasing the latch means, thereby to impart a step-by-step snap-action relative movement between the operating member and the supporting member.

For a better understanding of the present invention, together with other and further objects thereof, reference is had to the following description taken in connection with the accompanying drawings, while its scope will be pointed out in the appended claims.

Figure 2:
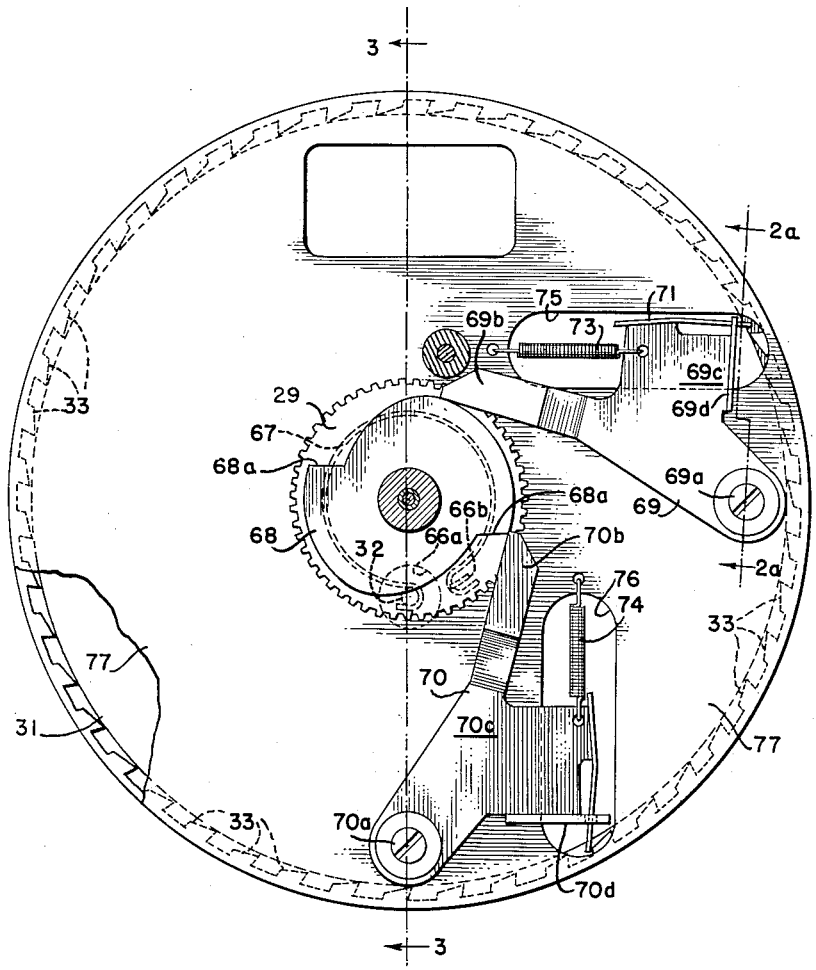
Figure 3:
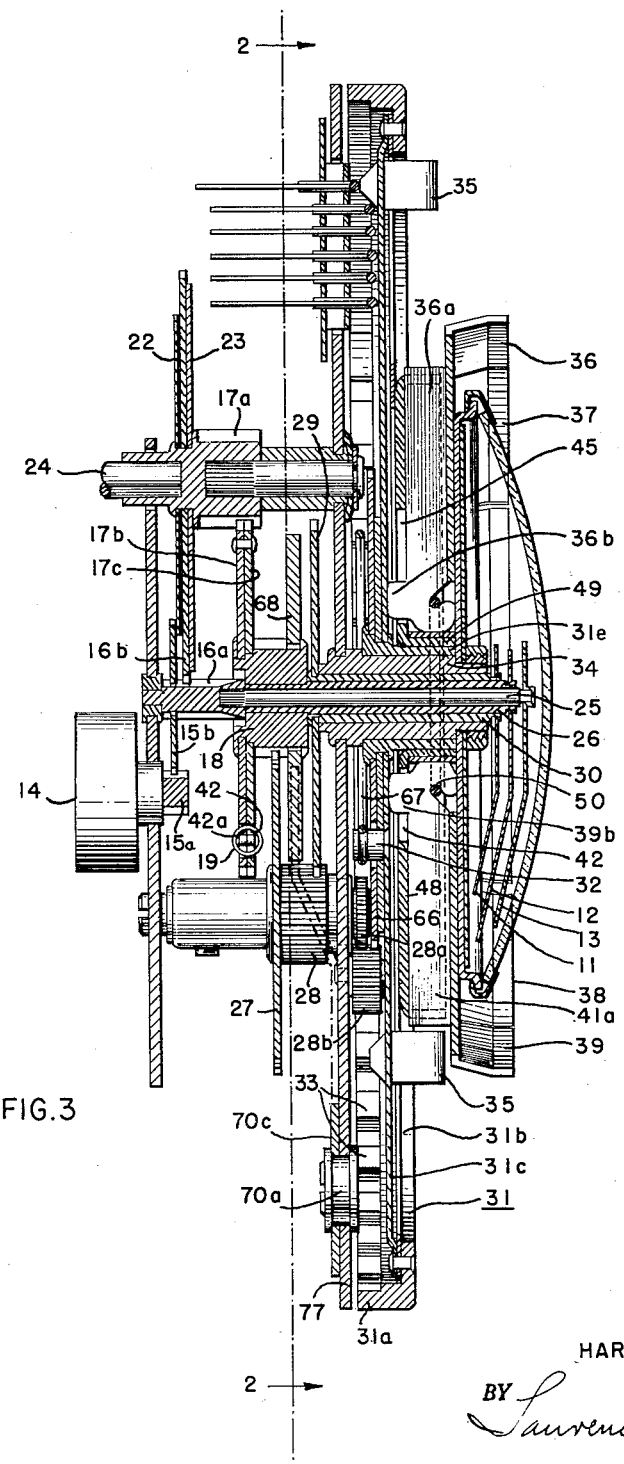
Figure 2A:
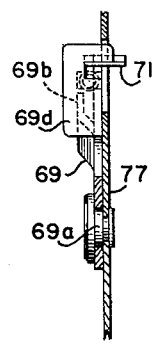
Figure 3B:
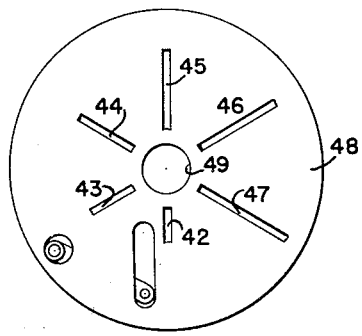
Figure 3A:
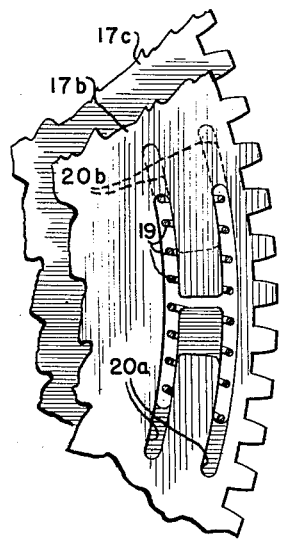
Figure 3C:
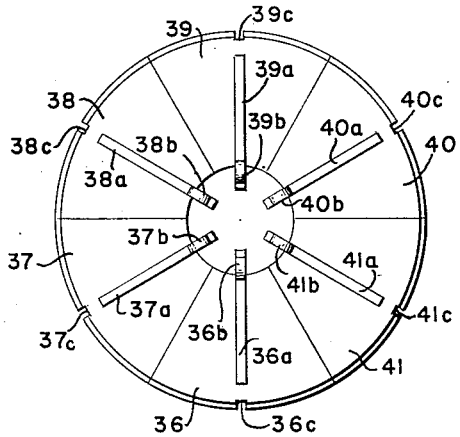
Figure 4:
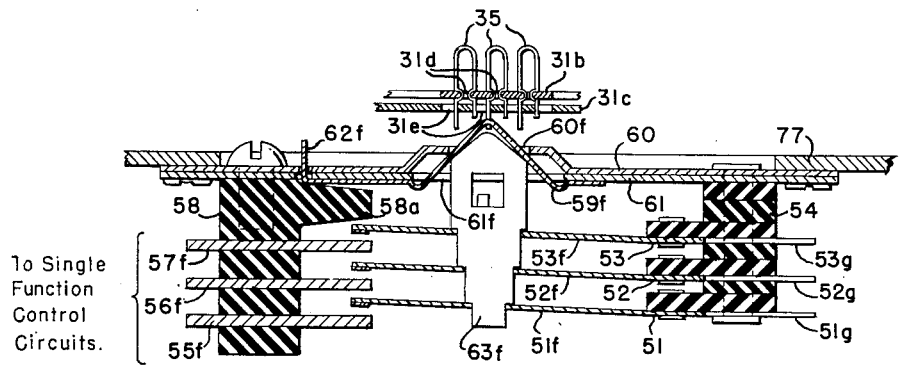
Figure 5:
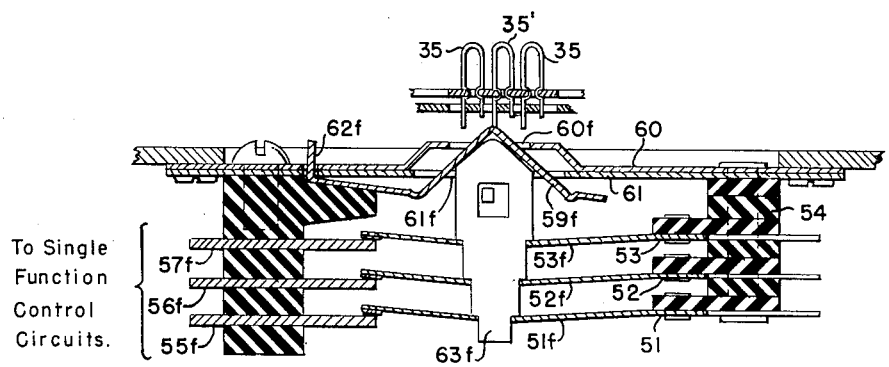
Figure 6:
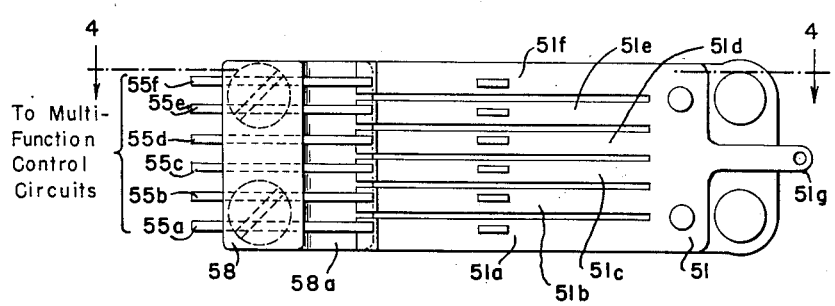
Figure 7:
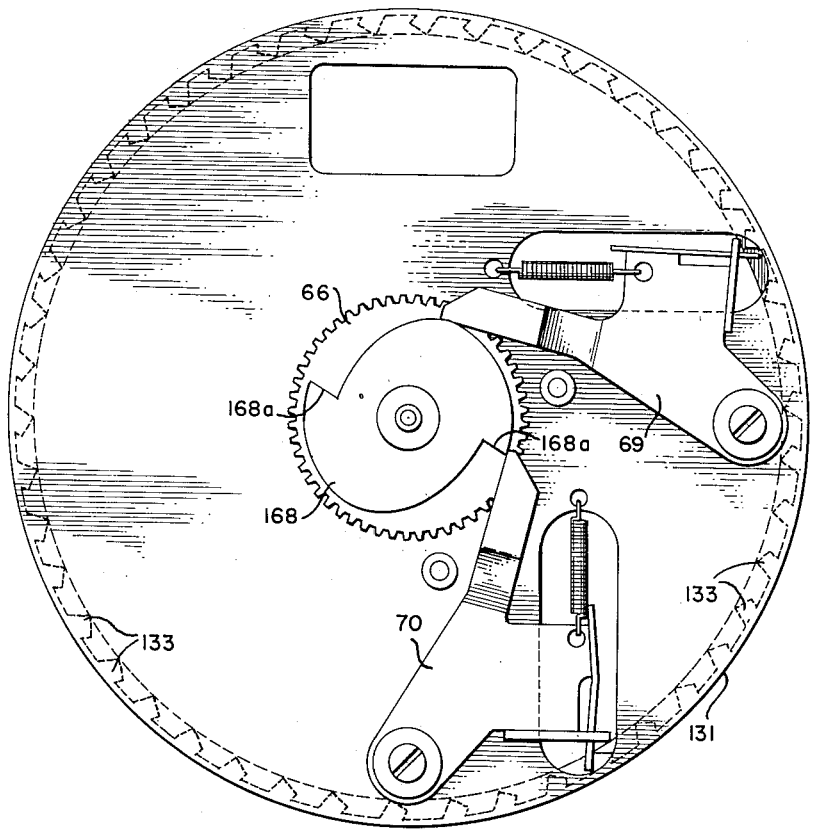
Figure 8:
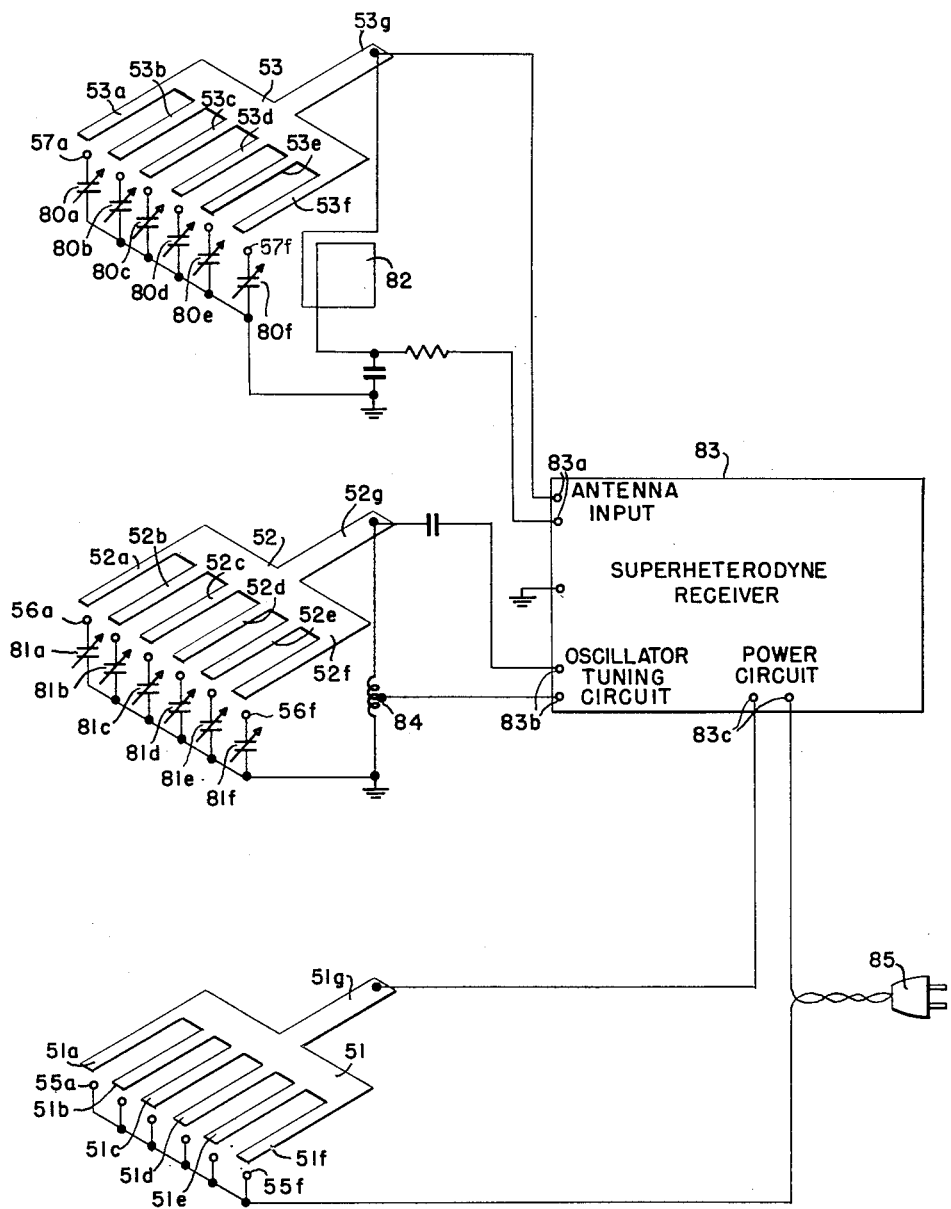

Referring now to the drawings, Fig. 1 is a front view of a program-scheduling apparatus embodying the invention; Fig. 2 is a rear view, partly sectionalized along the line 2—2 of Fig. 3, of the mechanism for imparting intermittent motion to the apparatus of Fig. 1; Fig. 2a is a cross-sectional detail of a portion of the mechanism along the line 2a—2a of Fig. 2; Fig. 3 is a cross-sectional view of the apparatus of Figs. 1 and 2 along the line 3—3 of Fig. 2; Fig. 3a is a detail of certain spring-loaded gearing mechanism, while Figs. 3b and 3c are detail rear views of elements of the apparatus of Figs. 1 and 2; Fig. 4 is a cross-sectional view, along the line 4—4 of Fig. 6, of the distributor or commutator device of the scheduling apparatus of Fig. 1 in circuit-open position; Fig. 5 is a similar view of the distributor or commutator device in circuit-closing position; Fig. 6 is a bottom view of the device of Figs. 4 and 5; Fig. 7 is a rear view of an alternative form of intermittent motion-imparting mechanism suitable for use in the apparatus of Fig. 1; while Fig. 8 is a schematic circuit diagram illustrating the application of the apparatus of Figs. 1-3, inclusive, to the control of a conventional superheterodyne receiver.

Referring now to Figs. 1, 2, and 3 of the drawings, there is illustrated an apparatus for setting up a predetermined schedule of a plurality of functions within a given time period. This apparatus is built around an electric clock which may be of the conventional synchronous type having a face 10 and hour, minute, and second hands 11, 12, and 13, respectively, driven from a synchronous motor 14 through a conventional gearing comprising the speed-reducing gears 15a, 15b; 16a, 16b; and 17a, 17b, 17c, the gear 17b being staked to a pinion 18 and the gear 17c being an idler gear rotatably mounted on a hub extension of the pinion 18. The gears 17b and 17c are spring-loaded to take up any backlash in the gearing and assist in attaining quiet operation. The spring loading is shown in detail in Fig. 3a and comprises a spring 19 set in complementary H-shaped recesses 20a, 20b of the gears 17b, 17c, respectively. The gear 16b is secured to the pinion 17a through a pair of friction plates 22 and 23 which are staked to a hub extension of the pinion 17a to which is secured a manual setting shaft 24. The pinion 16a is connected to drive a shaft 25 on which is secured the second hand 13. The pinion 18 is attached to a sleeve 26 journalled on the shaft 25 and driving the minute hand 12. The pinion 18 drives a gear 27 attached to a pinion 28 which drives a gear 29 secured to a sleeve 30 journalled on the sleeve 26 and on which is mounted the hour hand 11. The apparatus described to this point is conventional and forms no part of the present invention, but is described for the purpose of showing the correlation of the program-scheduling apparatus of the invention with a conventional clock mechanism.

The program-scheduling apparatus, per se, includes a group of settable members, means for movably supporting such members, and a group of member-setting devices, one of such groups corresponding in number to the number of time intervals in the time period and the other group corresponding in number to the number of functions to be scheduled. More specifically, the means for movably supporting the settable members comprises a rotatable circular supporting frame 31 comprising an annular flanged ring 31a to which are riveted or otherwise secured a flat disc or plate 31b and a dished disc or plate 31c to provide a spacing between the two plates. Each of the plates 31b and 31c is formed with a plurality of equally spaced radial slots equal in number to the number of intervals in the time period, the slots 31d in plate 31b being staggered with respect to the slots 31e in plate 31c as shown framentarily in Fig. 4. In the specific example shown, each of the plates has ninety-six of such slots, providing ninety-six quarter-hour time intervals over a 24-hour day. On the internal periphery of flanged ring 31a are formed a series of teeth 33, equal in number to one-half the number of time intervals, that is, 48. The frame 31 is journalled on a sleeve 34 mounted in a stationary frame plate 77 comprising a portion of the housing and supporting structure of the apparatus.

The group of settable members of the scheduling apparatus comprises a series of sliders 35 individually mounted in the radial slots of the frame 31, whereby the sliders also correspond in number to the number of time intervals. The sliders 35 frictionally engage their respective slots to maintain the positions in which they are set, but are settable between inoperative positions at the innermost ends of their radial slots and a plurality of positions equally spaced outwardly therefrom and equal in number to the number of functions to be scheduled. In Fig. 1 the majority of the settable sliders are indicated in inoperative position and not shown, while a group are shown in various operating settings.

The group of members-setting devices of the scheduling apparatus comprises a series of flanged sectors 36–41, inclusive, which have unitary depending ribs 36a–41a, inclusive, as shown in Figs. 3 and 3c. The ribs 36a–41a, inclusive, are provided with extending lugs 36b–41b, inclusive, respectively, which slide in a series of slots 42–47, inclusive, of a plate 48 having a flanged hub 49 journalled on a hub 31e of plates 31b and 31c which, in turn, is supported on a stationary sleeve 34 mounted in the housing of the apparatus. As indicated in Fig. 3b, the slots 42–47, inclusive, are of progressively varying length so that each of the member-setting devices 36–41, inclusive, has a different characteristic movement for setting any of the sliders 35 with which it it in operative engagement to a predetermined different one of its several operating positions. The inner ends of the ribs 36a–41a, inclusive, are slotted and receive a resilient tensioning band 50 for normally retaining the member-setting sectors 36–41, inclusive, in their retracted positions. As shown in Fig. 1, the sectors 36–41, inclusive, are provided with index slots 36c–41c, inclusive, respectively, which are in alignment with their respective ribs 36a–41a, inclusive. Alignment of any of the ribs 36a–41a, inclusive, with any given slider 35 and outward movement of its respective sector moves the respective slider 35 into an operative position corresponding to the particular function represented by the sector which was operated.

The program-scheduling apparatus of the invention also includes a plurality of stationary function-controlling devices equal in number to the number of functions to be scheduled, each disposed to be actuated by any of the slider members in registry therewith, that is, set to a corresponding function-controlling position. The function-controlling devices may take the form of a multiple-function control switch, as shown in detail in Figs. 4, 5, and 6. As there shown, this device comprises a multi-contact electric switch comprising a plurality of contact combs 51, 52, and 53, each having a plurality of contact blades, such as the blades 51a–51f, inclusive, equal in number to the number of said functions and spaced in correspondence with the spaced positions of the slider members 35, that is, spaced in accordance with the differences in length of the slots 42–47, inclusive, respectively, of the plate 48. The combs 51, 52, and 53 are provided with terminal connectors 51g, 52g, and 53g, respectively, and are rigidly mounted on a post 54 of insulation material so that the corresponding ones of the comb teeth form a series of three aligned contact blades, such as the blades 51f, 52f, and 53f of Figs. 4 and 5. Each of these series of aligned contact blades co-operates with a series of stationary contacts, such as the contacts 55f, 56f, and 57f of Figs. 4 and 5, secured in a post 58 of insulation material. The posts 54 and 58 are secured by rivets, bolts, or the like, to base plates 60, 61 which, in turn, are secured to a frame plate 77. The contacts 55f, 56f, and 57f are adapted for connection to the control circuits of a single function, for example, to switch in appropriate tuning elements of a radio receiver as shown in Fig. 8.

The multi-contact electric switch of Figs. 4, 5, and 6 also includes a plurality of full-floating actuators individual to each series of aligned blades and each disposed to be actuated by any of said slider members in registry therewith. Each of these actuators may be in the form of a resilient wire or bail, such as the element 59f of Figs. 4 and 5. These actuators have a V-shaped portion which protrudes through a series of slots, such as the slot 60f, in a stationary dished supporting plate 60 and slots, such as slot 61f, in a second stationary supporting plate 61. The actuators have upwardly turned lugs, such as the lug 62f of Figs. 4 and 5, extending through aligned holes in the plates 60 and 61. A protruding shelf 58a of post 58 limits the downward movement of the bails 59a–59g, inclusive. The multi-contact switch also includes a plurality of full-floating links of insulation material, such as the link 63f, individually interconnecting corresponding ones of the series of contact blades, such as the blades 51f, 52f, and 53f, and the corresponding actuator 59f.

The manner in which the slider members 35 cooperate with the function-controlling switch is shown in Figs. 4 and 5. In Fig. 4, three slider members 35 are shown, all of them being in an inoperative position so that none of them is in registry with any of the actuator bails 59a–59f, inclusive, and so that none of the switch contacts is closed. In Fig. 5 one of the slider members 35′ has been moved radially outwardly to the position in which, upon rotation of the frame 31 by the timing mechanism, as described hereinafter, it engages the actuator 59f to depress its associated insulation link 63f which, in turn, actuates the switch blades 51f, 52f, and 53f to close the circuits through their respective stationary contacts 55f, 56f, and 57f. As shown in Fig. 4, each of the slider members 35 is in the form of a stirrup with one arm longer than the other and having inwardly extending grooves engaging opposite edges of the slots 31d of the plate 31b. Since the slots 31d of plate 31b are staggered with respect to the slots 31e of plate 31c, the ribs between the slots 31e act as spreaders for the extending arms of the sliders 35 and thereby securely hold them in position without interfering with their sliding movement.

The program-scheduling apparatus of the invention also includes means for establishing an operative connection between any of the groups of settable members and any of the function-controlling devices. This means is illustrated in Figs. 1 and 2 and comprises a continuously driven timing member and a snap-action lost-motion driving mechanism effecting intermittent snap-action relative movement between the frame 31 and the function-controlling devices comprised in the multi-function switch to bring the slider members 35 set in operative positions into registry with the actuators 59a–59f, inclusive, for determining the desired function-time intervals. Specifically, this connection establishing means includes a continuously driven timing member, specifically, a gear 66 driven by a gear 28a on the same shaft as pinion 28 through an idler gear 28b. Gear 66 is thus driven synchronously with the hour shaft 30 with a 2:1 gear ratio so that it rotates within a period of 24 hours. Adjacent the gear 66 is the plate 31c from which projects one or more studs 32 extending through an enlarged hole 66a in the gear 66. The gear 66 also has extending therefrom a lug 66b and a torsional spring 67 extends from the stud 32 to the lug 66b. These elements described comprise a lost-motion driving connection between the driven gear 66 and the frame 31 including a normally stressed spring interconnecting them and biasing the frame to follow the gear 66 as it is driven.

This driving mechanism for the frame 31 also includes an auxiliary precision timing member and an escapement mechanism controlled by the timing member for periodically releasing the lost-motion driving connection to impart a snap-action movement to the frame 31. The precision timing member may be in the form of a multi-lobe, specifically a two-lobe, precision timing cam 68, having drop-off or trailing edges 68a, 68a of substantial but finite slopes. The cam 68 is secured to the pinion 18 attached to the sleeve 26 driving the minute hand 12. Co-operating with the timing cam 68 and controlled thereby are a pair of pivoted escapement arms 69 and 70 pivoted to the stationary frame 77 of the apparatus by pivots 69a and 70a, respectively. In order to engage the cam 68, the arms 69 and 70 have axially off-set portions 69b and 70b, respectively. The arms 69 and 70 have laterally extending portions 69c and 70c, respectively, and up-turned flanges 69d and 70d, respectively. On the ends of the extensions 69c and 70c are secured leaf-springs 71 and 72, respectively, extending through apertures in the flanges 69d and 70d, respectively. A detailed view of this portion of the escapement arms is shown in Fig. 2a. The escapement arms 69 and 70 are biased into engagement with the timing cam 68 by tensioned springs 73 and 74, respectively. The leaf-springs 71 and 72 extend through apertures 75 and 76, respectively, in the stationary frame plate 77. The spacing of the pivots 69a and 70a of the escapement arms is such that the leaf-springs 71 and 72, which are disposed to engage the teeth 33 of frame 31, are spaced by a multiple of the half-spacing of the teeth so that when one spring engages a tooth of the frame 31, the other spring is in mid-position between two adjacent teeth. Upon rotation of the precision timing cam 68, the escapement arms 69 and 70 thus alternately engage the frame teeth in a well-known manner to impart intermittent, substantially instantaneous movement to the frame.

While the program-scheduling apparatus described is suitable for a wide range of control purposes, such as industrial control systems, it is also particularly suitable for use in setting-up a listening program of a radio broadcast receiver. Fig. 8 is a schematic representation of the connection of the function-controlling devices, that is, the multi-contact electric switch, in a circuit to control the tuning of a super-heterodyne receiver 83. The series of movable switch contacts 53a-53f, inclusive, and their co-operating stationary contacts 57a-57f, inclusive, are arranged individually to connect a series of tuning condensers 80a-80f, inclusive, in circuit with a loop antenna 82, the antenna circuit being connected to antenna input terminals 83a of the receiver 83. Similarly, the movable contact elements 52a-52f, inclusive, and their associated stationary contacts 56a-56f, inclusive, are arranged individually to connect a series of circuit tuning elements, for example, tuning condensers 81a-81f, inclusive, across an inductor 84 to form a frequency-determining circuit for the oscillator of the receiver 83, this circuit being connected to terminals 83b of the receiver. It will be understood that each of the pairs of tuning condensers 80a, 81a, 80b, 81b, etc., is selected and adjusted to tune the receiver to a particular one of a number of desired broadcasting stations.

The movable contacts 51a-51f, inclusive, and their co-operating stationary contacts 55a-55f, inclusive, are connected in parallel so that, upon the closure of any pair of these co-operating contacts, the power circuit comprising terminals 83c of the receiver 83 is energized from a suitable source, such as a convenience outlet plug 85.

In considering the operation of the program-scheduling apparatus described, it will be assumed that initially all of the slider members 35 are moved manually to their innermost or inoperative positions. Thereupon the operator may rotate the member-setting sectors 36-41, inclusive, using their flanges as a knob until the recess of one of the sectors, for example, the recess 36c, is opposite the slot 31d of the frame 31 corresponding to the time interval in which it is desired to initiate the function represented by the sector 36, for example, to tune the radio to a particular station. Sector 36 is then moved outwardly, its rib 36a engaging the corresponding slider member 35 and moving it outward by the length of the slot 45 in which the lug 35b engages. It will be understood that this movement, characteristic of the sector 36, is different for each of the sectors, each sector being effective to move any slider member with which it is in registry into a different one of its operative positions corresponding to the radial position of a different one of the actuators 60a-60f, inclusive, (Figs. 4, 5). Similarly, the group of sectors may be rotated until each of them is operated to adjust the several slider members 35 to set up the desired program schedule for the entire 24 hours. It is seen that the program-scheduling apparatus of the invention requires only a number of slider members 35 equal to the number of time intervals into which the total time period is divided and requires only a number of slider setting sectors 36-41, inclusive, equal in number to the number of control functions, for example, the number of broadcast stations to which a receiver is to be tuned. Since each of the sectors 36-41, inclusive, is operable quickly and accurately to a single limiting position which is characteristic thereof, it may be operated to set any desired number of slider members 35 in quick succession and an entire 24-hour program may be scheduled or set up accurately and in a minimum of time.

During the normal operation of the apparatus as driven by the timing motor 14, it is understood that the frame 31 carrying the slider members 35 is rotated through the gearing described once each 24 hours. During this rotation, each of the slider members 35 which is set into any one of its six operating positions will in succession engage the corresponding one of the actuators 59a-59f, inclusive, of the function-controlling switch as the frame 31 is rotated.

As described above, the frame 31 has a periodic intermittent movement under the control of the escapement arms 69 and 70. This is effected by the cam 68 which rotates once an hour. Since the cam has two lobes and since the escapement arms 69 and 70 are displaced by one-quarter revolution, the cams 69 and 70 are alternately raised and released every quarter hour. Since the spacing of the springs 71 and 72 of the escapement arms is a multiple of one-half of the tooth spacing of the frame 31, upon each release of one of the escapement arms 69 or 70, the frame 31 is released to complete a snap-action movement through an angular distance equal to one-half the tooth spacing. Since the frame 31 includes 48 teeth, this is effective to produce in each 24-hour period 96 intermittent snap-action movements corresponding to the 96 quarter-hour periods in the 24-hour interval.

It is believed that the operation of the function-controlling switch will be clear from the foregoing description. In brief, upon the registry of any one of the slider members 35 with one of the actuators, for example, actuator 59f as in Fig. 5, this actuator is depressed, depressing also the insulation link 63f which, in turn, actuates the switch contact blades 51f, 52f, 53f to make engagement with their respective stationary contact members 55f, 56f, 57f. As shown in Fig. 8, the completion of the control circuits through these three switch contacts is effective to connect tuning condensers 80f and 81f into the antenna circuit and oscillator circuit of the receiver and simultaneously to close the power circuit for the receiver through the contacts 51f, 55f. The receiver will then operate on the station corresponding to the sector 41 for a period of a quarter hour. Similarly, other slider members set into operative positions as described will be effective to tune the receiver to other stations for other quarter-hour periods as selected. It will be apparent that the several control circuits controlled by the multi-function distributor switch may be utilized for effecting any desired control operations.

The program-scheduling apparatus described is capable of giving a high degree of precision; for example, a precision of some 5 to 10 seconds in the initiation and completion of each time-function interval can be readily obtained with ordinary manufacturing tolerances. This is to be compared with a precision of several minutes which is the best obtainable in the usual program-scheduling apparatus which does not include an auxiliary precision timing element equivalent to the cam 68. At the same time, the disposition of the teeth 33 in the frame 31 relative to the slots 31d is such that the snap-action of the frame 31 causes the slider members 35 to move the actuators 59a–59f, inclusive, to close the switch contacts with a rapid snap action. Also during the successive snap action of the frame 31, the actuators 59a–59f, inclusive, are rapidly released to provide a quick-break action of the function-controlling switch.

The apparatus of Figs. 1–3, inclusive, is extremely quiet in operation due to the fact that the trailing edges 68a of the cam 68 have a substantial but finite slope which effect a rapid but smooth and continuous movement of the arms 69b and 70b of the escapement arms 69 and 70 when they leave the high portions of the cam 68. This quietness of operation is enhanced by giving the leading edges of the teeth 33 a slight slope so that the frame 31 moves rapidly but continuously during the final portion of each intermittent movement while the leaf springs 71 or 72 move over the sloping portion of the tooth face. The use of the springs 71 and 72 as the engaging elements of the escapement arms also contributes to quietness of operation. In addition, the loading of the gears 17b, 17c (Figs. 3 and 3a) by the spring 19 effectively eliminates noise due to any backlash in the gearing which drives the cam 68.

In certain applications it may be more important to achieve maximum precision rather than maximum quietness of operation. An alternative form of snap-action lost-motion mechanism with such a characteristic is shown in Fig. 7, which is generally similar to that of Fig. 2, and in which corresponding elements are identified by the same reference numerals. The lost-motion mechanism of Fig. 7 differs from that of Fig. 2 only in two respects. First, the cam 168 has sharp drop-off trailing edges 168a, 168a, while the teeth 133 of the frame 131 have front faces of steep slope. With this construction, each of the snap-action movements is substantially instantaneous, that is, it is of a rapidity which is limited only by the inertia of the moving parts and the force of the spring 67 which biases the frame 31 to follow the driving gear 66. With this construction a timing precision of from one to two seconds has been readily attained with reasonable manufacturing tolerances. This increased precision is at the expense of a certain amount of click noise due to the substantially instantaneous movement of the frame 131 under the control of the escapement arms 69 and 70 and the cam 168.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one of said members and including a series of stops related in number to the number of desired time intervals within said given time interval; an energy-storage lost-motion driving connection between said timing element and said driven member; latching means disposed to engage said stops in sequence to restrain said driven member; and an auxiliary precision timing member adapted to be driven by said timing element with a higher speed ratio than said driven member for periodically releasing said latch means, thereby to impart a step-by-step snap-action relative movement between said operating member and said supporting member.

2. In a program apparatus for setting up a predetermined series of operations within a given time interval and including a continuously driven timing element, an operating member and a supporting member carrying a plurality of elements settable in correspondence with desired time intervals, said supporting member being rotatable relative to said operating member to register said settable elements with said operating member, a precision driving mechanism for said supporting member comprising: a driven member unitary with said supporting member and including a series of stops related in number to the number of desired time intervals within said given time interval; an energy-storage lost-motion driving connection between said timing element and said driven member; latching means disposed to engage said stops in sequence to restrain said driven member; and an auxiliary precision timing member adapted to be driven by said timing element with a higher speed ratio than said driven member for periodically releasing said latch means, thereby to impart a step-by-step snap-action movement to said supporting member.

3. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one said members and including a series of stops related in number to the number of desired time intervals within said given time interval; an energy-storage lost-motion driving connection between said timing element and said driven member including a normally stressed spring biasing the latter to follow said timing element; latching means disposed to engage said stops in sequence to restrain said driven member; and an auxiliary precision timing member adapted to be driven by said timing element with a higher speed ratio than said driven member for periodically releasing said latch means, thereby to impart a step-by-step snap-action relative movement between said operating member and said supporting member.

4. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one said members and including a series of stops related in number to the number of desired time intervals within said given time interval; an energy-storage lost-motion driving connection between said timing element and said driven member; an escapement mechanism disposed to engage said stops in sequence to restrain said driven member; and an auxiliary precision timing member adapted to be driven by said timing element with a higher speed ratio than said driven member for periodically releasing said escapement, thereby to impart a step-by-step snap-action relative movement between said operating member and said supporting member.

5. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one said members and including a series of teeth related in number to the number of desired time intervals within said given time interval; an energy-storage lost-motion driving connection between said timing element and said driven member; a pair of pivoted escapement arms alternately engageable with said series of teeth; and an auxiliary precision multilobe cam adapted to be driven by said timing element with a higher speed ratio than said driven member for periodically releasing said escapement arms alternately, thereby to impart a step-by-step snap-action relative movement between said operating member and said supporting member.

6. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one said members and including a series of stops related in number to the number of desired time intervals within said given time interval; an energy-storage lost-motion driving connection between said timing element and said driven member; an escapement mechanism disposed to engage said stops in sequence to restrain said driven member; and an auxiliary precision timing cam having a sharp drop-off edge and adapted to be driven by said timing element with a higher speed ratio than said driven member for periodically releasing said escapement mechanism, thereby to impart a step-by-step substantially instantaneous relative movement between said operating member and said supporting member.

7. In a program apparatus for setting up a predetermined series of operations within a given time interval and including a continuously driven timing element, an operating member and a supporting member carrying a plurality of elements settable in correspondence with desired time intervals, said members being relatively movable to register said settable elements with said operating member, a precision driving mechanism for one of said members comprising: a driven member unitary with said one said members and including a series of stops related in number to the number of desired time intervals within said given time interval; an energy-storage lost-motion driving connection between said timing element and said driven member; an escapement mechanism disposed to engage said stops in sequence to restrain said driven member; and an auxiliary precision timing cam having a trailing edge of substantial but finite slope and adapted to be driven by said timing element with a higher speed ratio than said driven member for periodically releasing said escapement mechanism, thereby to impart a step-by-step relative movement between said operating member and said supporting member of a duration which is a small fraction of the interval between motions.

HAROLD F. ELLIOTT.

REFERENCES CITED

The following references are of record in the file of this patent:

UNITED STATES PATENTS

| Number | Name | Date |
|---|---|---|
| 2,045,251 | Raber | June 23, 1936 |
| 2,096,072 | Spagnola | Oct. 19, 1937 |
| 2,130,164 | Verkins | Sept. 13, 1938 |
| 2,187,373 | Cheney | Jan. 16, 1940 |
| 2,216,272 | Kaye | Oct. 1, 1940 |
| 2,240,498 | Elliott | May 6, 1941 |
| 2,257,537 | Samburg | Sept. 30, 1941 |
| 2,272,545 | Chalupowski | Feb. 10, 1942 |